United States Patent [19]
Miura et al.

[11] Patent Number: 5,374,934
[45] Date of Patent: Dec. 20, 1994

[54] ANTENNA MIRROR-SURFACE MEASURING SYSTEM

[75] Inventors: Koryo Miura, 3-9-7, Tsurukawa, Machida-shi, Tokyo; Tadashi Takano, 1-21-8, Hatsudai, Shibuya-ku, Tokyo; Hiroyuki Deguchi, Kanagawa; Takashi Ebisui, Kanagawa; Takashi Katagi, Kanagawa, all of Japan

[73] Assignees: Mitsubishi Denki Kabushiki Kaisha; Koryo Miura; Tadashi Takano, all of Tokyo, Japan

[21] Appl. No.: 848,325

[22] Filed: Mar. 9, 1992

[30] Foreign Application Priority Data

Mar. 11, 1991 [JP] Japan .................................. 3-044987

[51] Int. Cl.⁵ .............................................. H01Q 3/00
[52] U.S. Cl. ..................................... 342/360; 343/703
[58] Field of Search .......................... 342/360; 343/703

[56] References Cited

U.S. PATENT DOCUMENTS

| | | | |
|---|---|---|---|
| 3,602,594 | 8/1971 | Cook et al. | 356/5 |
| 4,201,987 | 5/1980 | Tricoles et al. | 343/703 |
| 4,553,145 | 11/1985 | Evans | 343/360 |
| 4,754,496 | 6/1988 | Fishkin et al. | 455/67 |

FOREIGN PATENT DOCUMENTS

| | | |
|---|---|---|
| 0130924 | 1/1985 | European Pat. Off. . |
| 1500952 | 8/1989 | U.S.S.R. ............................. 343/703 |

OTHER PUBLICATIONS

Davies et al, "Field Probe For Measuring Both Amplitude And Phase Of Antenna Radiation Patterns", *Elec. Letters* Nov. 6, 1980. vol. 16, No. 23.

Gipson et al, "Surface Accuracy of the ATS-2 Antenna Using Microwave Holography", Interferometrics Inc, Mar. 1, 1989 p. 7.

Rahmat-Samii, "Microwave Holography of Large Reflector Antennas—Simulation Algorithms", IEEE Trans. on Ant. and Prop. AP-33 No. 11, Nov. 1985.

Bennett et al, "Microwave Holographic Meterology of Large Reflector Antennas", IEEE Trans. on Ant. and Prop. AP-24, No. 3, May 1976.

Rhoades et al, "Large Millimeter Wave Antenna Systems", Microwave Systems News, Dec. 1988.

Electronics Letters, vol. 22, No. 19, Sep. 1986, Great Britain, pp. 977-978, Grattan et al. Microwave Holographic Technique for Reflector Antenna Profile Measurement.

Bibliothek Des Deutschen Patentamtes w/translation.

Bibliothek Des Deutschen Patentamtes, Measurement of Reflector Accuracy of the 30-m Millimeter Radio Telescope. Baars & Harth.

Bibliothek Des Deutschen Patentamtes, Radiation Properties of a Sar Antenna Panel Determined by Planar . . . Klooster.

"Antenna Engineering Handbook", 1980, pp. 448 to 459.

*Primary Examiner*—Gregory C. Issing
*Attorney, Agent, or Firm*—Wolf, Greenfield & Sacks

[57] ABSTRACT

A positioner supports an antenna at an optional rotating angle and the mirror surface of the antenna at different rotating angles is measured. A computer expands the measured value into series using polar coordinates system associated with the measuring system, whereby the intrinsic deformation of the mirror surface under the zero-gravity condition and the deformation due to gravity are separately measured.

14 Claims, 12 Drawing Sheets

ANTENNA MIRROR-SURFACE MEASURING SYSTEM

BACKGROUND OF THE INVENTION

1. Field of the Invention

This invention relates to an apparatus and a method for measuring the accuracy of a mirror surface of a reflecting mirror antenna or the like which are mounted on a satellite.

2. Description of the Prior Art

An example of apparatus of this type in the prior art is shown in FIG. 1. The arrangement shown in FIG. 1 is disclosed in the "Antenna Engineering Handbook" edited by the Japanese Institute of Electronics, Information and Communication Engineers, p. 458, Jun. 20, 1988, published by OHM Co., Ltd. In FIG. 1, the numeral 1 denotes an antenna, 2 denotes a theodolite for measuring the mirror surface of the antenna by the triangulation method, and 3 denotes a controller for measuring the mirror surface with the theodolite 2.

The operation of the apparatus shown in FIG. 1 is as follows: The antenna 1 is fixed in a horizontal position so that the mirror surface of the antenna can be seen from the theodolites 2. A plurality of theodolites 2 face to the mirror surface from different positions and measure the configuration of the mirror surface in the three-dimensional coordinates system. A controller 3 controls the theodolites 3 to automatically measure points on the mirror surface directed by the theodolites and record the measured results. Therefore, the configuration of the mirror surface can be measured in the three-dimensional coordinates system.

Another apparatus of this type in the prior art is shown in FIG. 2. This arrangement is also described in the "Antenna Engineering Handbook" edited by the Japanese Institute of Electronics, Information and Communication Engineers, p. 449, published by OHM Co., Ltd. on Jun. 20, 1988. In FIG. 2, the numeral 4 denotes a probe for measuring the electric field distribution in the vicinity of antenna 1, 5 denotes a scanner for plane-scanning the probe 4, and 6 denotes a transceiver. The beam axis of the antenna 1 is defined as the axis z, and thereby the coordinates associated with the antenna are defined as the x-y-z orthogonal coordinates system and the coordinates associated with the scanner as the X-Y-Z orthogonal coordinates system. Moreover, the antenna 1 is placed so that the x-y plane and X-Y plane are parallel. With the arrangement, the electric field distribution in the vicinity of the antenna is measured and the deviation from the phase distribution of the ideal mirror surface is obtained from the measured phase distribution, thereby an error of the mirror surface can be obtained.

Since conventional antenna mirror surface measuring apparatuses were constituted as explained above, the measurement was made under the condition that an antenna is deformed by the influence of-the gravity. Accordingly, here rises a problem that the intrinsic deformation of the mirror surface in such a condition that a satellite is set on an orbit, namely under the zero-gravity condition cannot be separated from the deformation due to the gravity.

SUMMARY OF THE INVENTION

The present invention has been proposed to solve the problems explained above and it is therefore an object of the present invention to provide an antenna mirror surface measuring apparatus and a measuring method for separately measuring the intrinsic deformation of a mirror surface under the zero-gravity condition and the deformation of the mirror surface due to the gravity for an antenna mounted on a satellite.

In accordance with the first aspect of the invention, an antenna mirror surface measuring apparatus comprises a distance and angle measuring means, a positioner for supporting an antenna to be measured, rotating the antenna around the main beam of this antenna and stopping the antenna at predetermined rotating angles to measure the configuration of the antenna mirror surface at each position of a plurality of different rotating angles, and a computer for executing an arithmetic operation of the series expansion of the measured values and separating the configuration of tile mirror surface which is independent of the rotating angles from the deformation of the mirror surface which is dependent on the rotating angles.

In accordance with the second aspect of the invention, an antenna mirror surface measuring apparatus comprises a probe for measuring the electric field distribution, a scanner for scanning this probe, a transceiver for transmitting and receiving a signal between an antenna to be measured and the probe, a positioner for supporting the antenna to be measured, rotating the antenna around the main beam of this antenna and stopping the antenna at predetermined rotating angles to measure the configuration of the mirror surface of the antenna at each position of a plurality of different rotating angles, and a completer for executing an arithmetic operation of the series expansion of the measured values and separating the configuration of the mirror surface which is independent of the rotating angles from the deformation of the mirror surface which is dependent on the rotating angles.

In accordance with the third aspect of the invention, an antenna mirror surface measuring apparatus comprises a rotating base supporting an antenna to be measured arid having two or more rotating axes, a transceiver for transmitting and receiving a signal to and from the antenna to be measured a positioner for supporting the antenna to be measured, rotating the antenna around the main beam of this antenna and stopping the antenna at predetermined rotating angles to measure the configuration of the mirror surface of the antenna at each position of a plurality of different rotating angles, and a computer for executing an arithmetic calculation of the series expansion of the measured values and separating the configuration of the mirror surface which is independent of the rotating angles from the deformation of the mirror surface which is dependent on the rotating angles.

Further, in accordance with the fourth aspect of the invention, an antenna mirror surface measuring method includes the steps of measuring two-dimensional electric field distribution in the vicinity of a reflecting mirror antenna, executing arithmetic operation of the measured values based on the plane wave expansion, converting the values for the measured position to values for a position different from the measured position, and obtaining the configuration of the mirror surface from the phase item of the electric field distribution.

Moreover, in accordance with the fifth aspect of the invention, an antenna mirror surface measuring method includes the steps of measuring two-dimensional electric field distribution in the vicinity of the range narrower than the aperture of an antenna to be measured, executing an arithmetic operation of the measured values based on the least squares method and the series expansion, separating the configuration of the mirror surface which is independent of the rotating angles from the deformation of the mirror surface which is dependent on the rotating angles, and obtaining the configuration of the antenna to be measured.

With the first aspect of the invention, the antenna mirror surface measuring apparatus can separately measure the intrinsic deformation of the mirror under the zero-gravity condition and the deformation of the mirror surface due to the gravity, because the positioner stops the antenna to be measured at optional rotating angles, the distance and angle measuring means, a controller measure the mirror surface of the antenna at different rotating angles and the computer expands a configurational value into series at a predetermined point on the mirror surface using the polar coordinates associated with the measuring system.

With the second aspect of the invention, the antenna mirror surface measuring apparatus can measure electrical characteristics under the zero-gravity condition and separately measure the intrinsic deformation of the mirror surface under the zero-gravity condition and the deformation of the mirror surface due to gravity, because the positioner stops the antenna to be measured at optional rotating angles, the two-dimensional electric field distribution are measured by the probe, the scanner and the transceiver at the different rotating angles of this antenna and the computer expands the phase distribution of predetermined points on the mirror surface into series using the polar coordinates associated with the measuring system.

With the third aspect of the invention, the antenna mirror surface measuring apparatus makes outdoor measurement, easier since a scanner is not used. As a result, the measurement of a large diameter antenna can be made easily. Further, the intrinsic deformation under the zero-gravity condition and the deformation of the mirror surface due to gravity can be measured separately, because the positioner stops the antenna at optional rotating angles, the rotating base enables spherical scanning or cylindrical scanning by using the two or more rotating axes, the electric field distributions at different rotating angles of the antenna are measured by using a probe and a transceiver, and the computer obtains the electric field distribution in the vicinity of the antenna from the measured values and expands the phase distribution of predetermined points on the mirror surface using the polar coordinates associated with the measuring system.

With the fourth aspect of the invention, the antenna mirror surface measuring method eliminates the influence of a primary horn or sub-reflecting mirror other than the main reflecting mirror and separately measures the intrinsic deformation of the mirror surface under the zero-gravity condition and the deformation of the mirror surface due to gravity, because the measured values of the two-dimensional electric field distribution of the reflecting mirror antenna for the measured position are converted to values for a position different from the measured position.

With the fifth aspect of the invention, the antenna mirror surface measuring method enables the range for measuring the electric field distribution off the antenna to be narrowered than the aperture diameter. As a result, the probe is scanned by tile scanner over the range narrower than the aperture diameter for obtaining the configuration of the mirror surface of a large diameter antenna and the intrinsic deformation of tile mirror surface under the zero-gravity condition and the deformation of mirror surface due to gravity are separately measured.

BRIEF DESCRIPTION OF THE DRAWINGS

The foregoing features and other features of the present invention will be understood from the following detailed description of the preferred embodiments in connection with the accompanying drawings, wherein.

DESCRIPTION OF THE PREFERRED EMBODIMENTS

Figure 1:
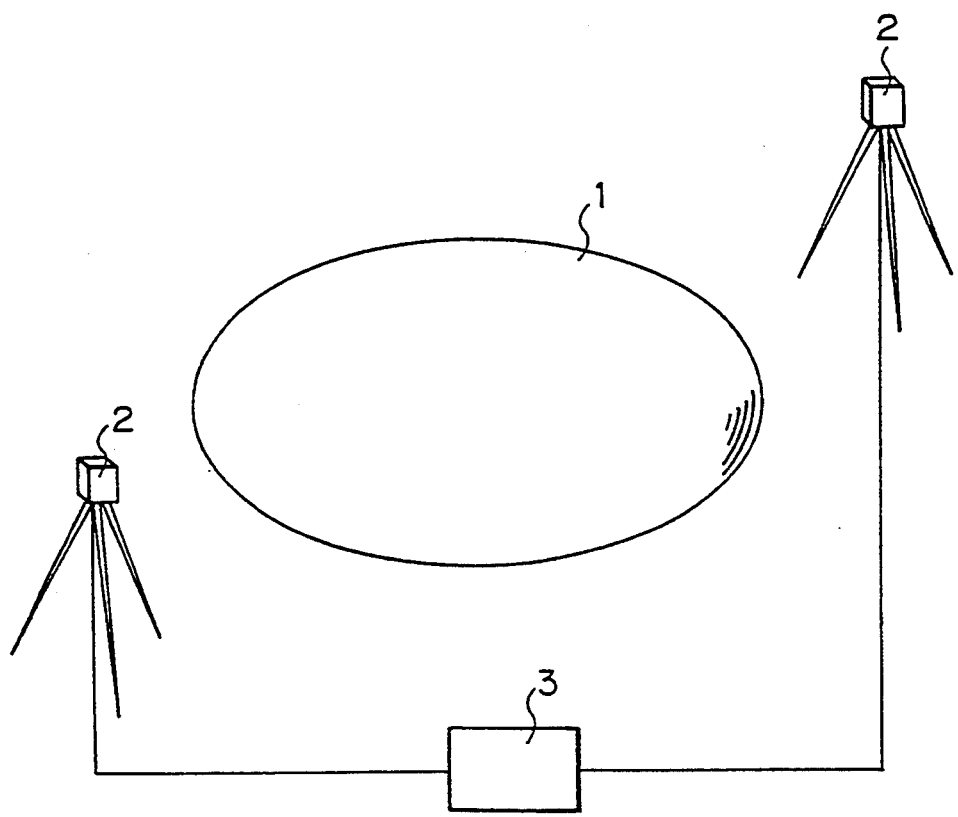
FIG. 1 is a schematic diagram illustrating the structure of a conventional antenna mirror surface measuring apparatus utilizing a theodolite.
Figure 3:
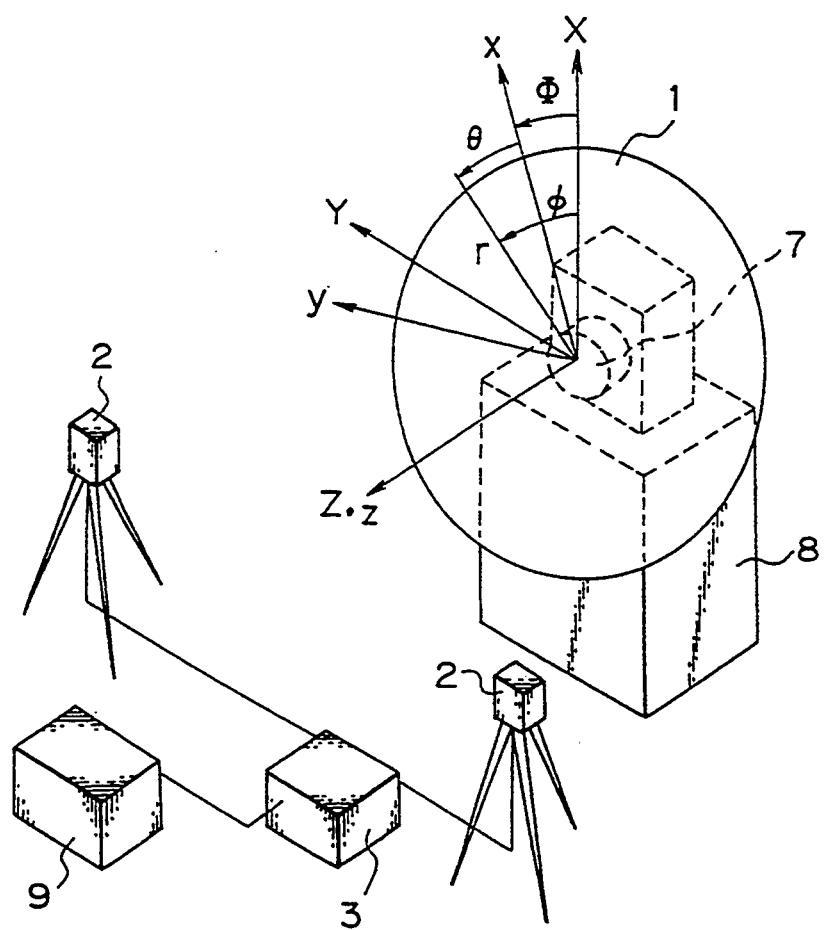
FIG. 3 is a schematic diagram illustrating a structure of the first embodiment of the present invention.

Referring to FIG. 3, there is shown the first embodiment according to the present invention. In FIG. 3, the reference numerals 1 to 3 denote the elements similar to those of the conventional apparatus shown in FIG. 1. The numeral 7 denotes a positioner which supports an antenna 1 and rotates the antenna around the one axis, 8 denotes a base rack which supports the antenna 1 and the positioner 7 at a predetermined height, 9 denotes a computer which executes arithmetic calculation for coordinates of the mirror surface measured at different rotating angles of the antenna 1.

In the operation, the coordinate systems associated with the antenna 1 are defined using the x-y-z orthogonal coordinates system and r-$\theta$ polar coordinates system and the coordinates systems associated with the measuring system are defined using the X-Y-X orthogonal coordinates system and r-$\phi$ polar coordinates system. A rotating angle $\Phi$ ($\phi=\theta+\Phi$) is a value according to the polar coordinates system of the measuring system. The positioner 7 rotates the antenna 1 by a predetermined rotating angle and fixes it at this angle. The theodolite 2 measures the mirror surface of the antenna 1 in three dimensions, that is, the roughness of the surface at the rotating position directed by the controller 3. Next, the positioner 7 is rotated to measure the mirror surface in three dimensions at a different angle. Thus, the three-dimensional coordinates of the mirror surface when the rotating angle is $\Phi_i$ can be obtained by repeating such measurements. A deviation in the normal direction from the ideal mirror surface, namely a mirror surface error $f_i(r, \theta)$ for each point is obtained from such measured values. The intrinsic deformation component of the mirror surface under the zero-gravity condition is separated from the deformation component of the mirror surface due to gravity by obtaining the series expansion of the measured mirror surface error. First, in the case of measuring the mirror surface by continuously changing the rotating angles, a measured value $f(r, \theta, \phi)$ of the mirror surface error can be expanded as follows by using the Fourier series for the angle component $\phi$:

$$f(r,\theta,\phi) = a_0(r,\theta) + \sum_{n=1}^{\infty} a_n(r,\theta)\cos n\phi + \sum_{n=1}^{\infty} b_n(r,\theta)\sin n\phi \quad (1)$$

The Fourier coefficients $a_0(r, \theta)$, $a_n(r, \theta)$, $b_n(r, \theta)$ are determined at each point $(r, \theta)$. In the case where the number of times of measurement $N$ ($\geq 2$) executed at different rotating angles is not sufficiently large, the number of expansion terms must be reduced to a Finite number. When the rotating angles are selected at equal angular intervals, the following relationship can be obtained.

$$\Phi_i = 2\pi i/N, (i=1, 2, \ldots, N) \quad (2)$$

Therefore, the following Fourier series can also be obtained.

(When $N$ is an even number)

$$a_0(r,\theta) = (1/N) \sum_{i=1}^{N} f(r,\theta)$$

$$a_n(r,\theta) = (2/N) \sum_{i=1}^{N} f(r,\theta)\cos[n(\theta + \Phi_i)],$$

$(n = 1,2,\ldots,N/2)$ $$a_{N/2}(r,\theta) = (1/N) \sum_{i=1}^{N} f(r,\theta)\cos[(N/2)(\theta + \Phi_i)],$$

$$b_n(r,\theta) = (2/N) \sum_{i=1}^{N} f(r,\theta)\sin[n(\theta + \Phi_i)],$$

$(n = 1,2,\ldots,N/2 - 1)$ (when $N$ is an odd number)

$$a_0(r,\theta) = (1/N) \sum_{i=1}^{N} f(r,\theta)$$

$$a_n(r,\partial 4) = (2/N) \sum_{i=1}^{N} f(r,\theta)\cos[n(\theta + \Phi_i)],$$

$(n = 1,2,\ldots,(N-1)/2)$ $$b_n(r,\theta) = (2/N) \sum_{i=1}^{N} f(r,\theta)\sin[n(\theta + \Phi_i)],$$

$(n = 1,2,\ldots,(N-1)/2)$ (3)

Moreover, measurement errors caused by other factors can be analyzed more easily by expanding the respective coefficients $a_0(r, \theta)$, $a_n(r, \theta)$, $b_n(r, \theta)$ using the Fourier series for the angular component $\theta$ associated with the mirror surface as follows:

$$a_0(r, \theta) = a_o{}^o(r) + \sum_{k=1}^{\infty} [\alpha_k{}^o(r)\cos k\theta + \beta_k{}^o(r)\sin k\theta]$$

$$a_n(r, \theta) = a_o{}^n(r) + \sum_{k=1}^{\infty} [\alpha_k{}^n(r)\cos k\theta + \beta_k{}^n(r)\sin k\theta]$$

$$b_n(r, \theta) = \epsilon_o{}^n(r) + \sum_{k=1}^{\infty} [\epsilon_k{}^n(r)\cos k\theta + \eta_k{}^n(r)\sin k\theta]$$

(4)

Figure 4:
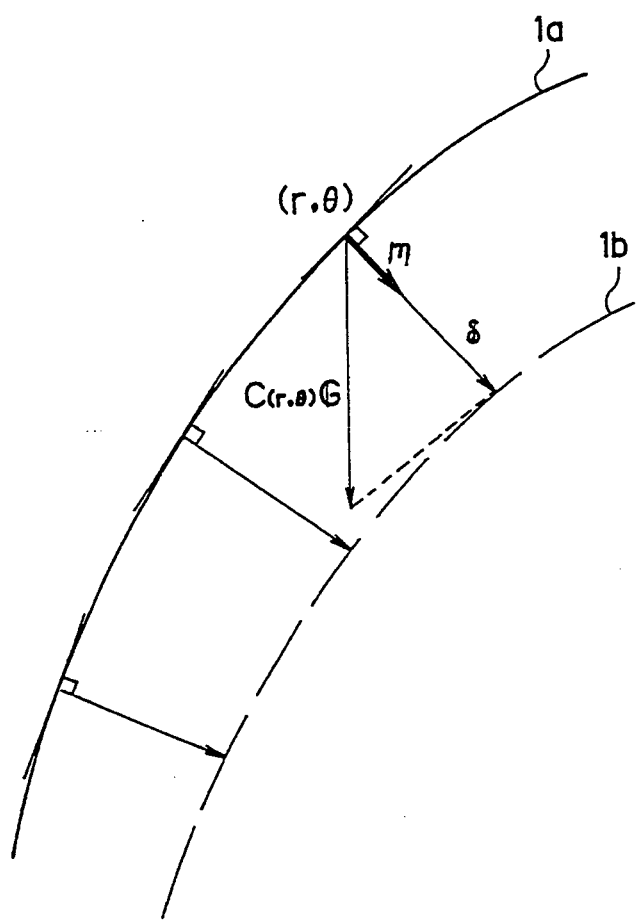
FIG. 4 is a diagram for explaining a deformation due to gravity in the first embodiment of the present invention.

FIG. 4 is a diagram for explaining a deformation caused by gravity that the mirror surface would be subjected to. An intrinsic configuration of the mirror surface under the zero-gravity condition is indicated by a solid line $1a$, while a deformation due to the gravity that the mirror surface would be subjected to is indicated by a broken line $1b$. In the case where the deformation due to the gravity to the mirror surface is very small and linear, a displacement vector $\delta$ in the normal direction of the gravity is expressed as follows:

$$\delta(r, \theta, \phi) = [C(r, \theta)G \cdot n]n \quad (5)$$

Where the vector n is a normal unit vector of the mirror surface, the vector G is a vector of the gravity and $C(r, \theta)$ is an unknown scalar coefficient depending on the deformation of each point on the mirror surface. The component $\delta_n$ in the normal direction of the vector $\delta$ can be summarized as follows:

$$\delta_n(r, \theta, \phi) = A_0(r, \theta, C) + A_1(r, \theta, C) \cos \phi + B_1(r, \theta, C) \sin \phi \quad (6)$$

Thus, if the intrinsic deformation of the mirror surface under the zero-gravity condition is defined as $q(r, \theta)$, a mirror surface error $f(r, \theta, \Phi)$ is given by $$f(r, \theta, \phi) = q(r, \theta) + \delta_n(r, \theta, \phi) \quad (7)$$

The intrinsic deformation $q(r, \theta)$ of the mirror surface under the zero-gravity condition and the deformation due to gravity $\delta_n(r, \theta, \phi)$ can be obtained at each point by comparing coefficients of the equations (1) to (8) and the equation (7) and solving these simultaneous equations.

Thus, the intrinsic deformation of the mirror surface under the zero-gravity condition and the deformation of the mirror surface due to gravity can be separately measured by expanding the configuration at a predetermined point on the mirror surface into series using the polar coordinates associated with the measuring system.

In this embodiment, a theodolite is used, but meritorious effects similar to those of this embodiment can also be attained even by using other mechanical measuring apparatus such as a photographic measuring apparatus, laser holography or the like. Moreover, an antenna to be measured may be any type of antenna such as a parabolic antenna, offset type antenna, dual reflecting mirror antenna or the like in such a manner that similar meritorious effects can be obtained.

Figure 2:
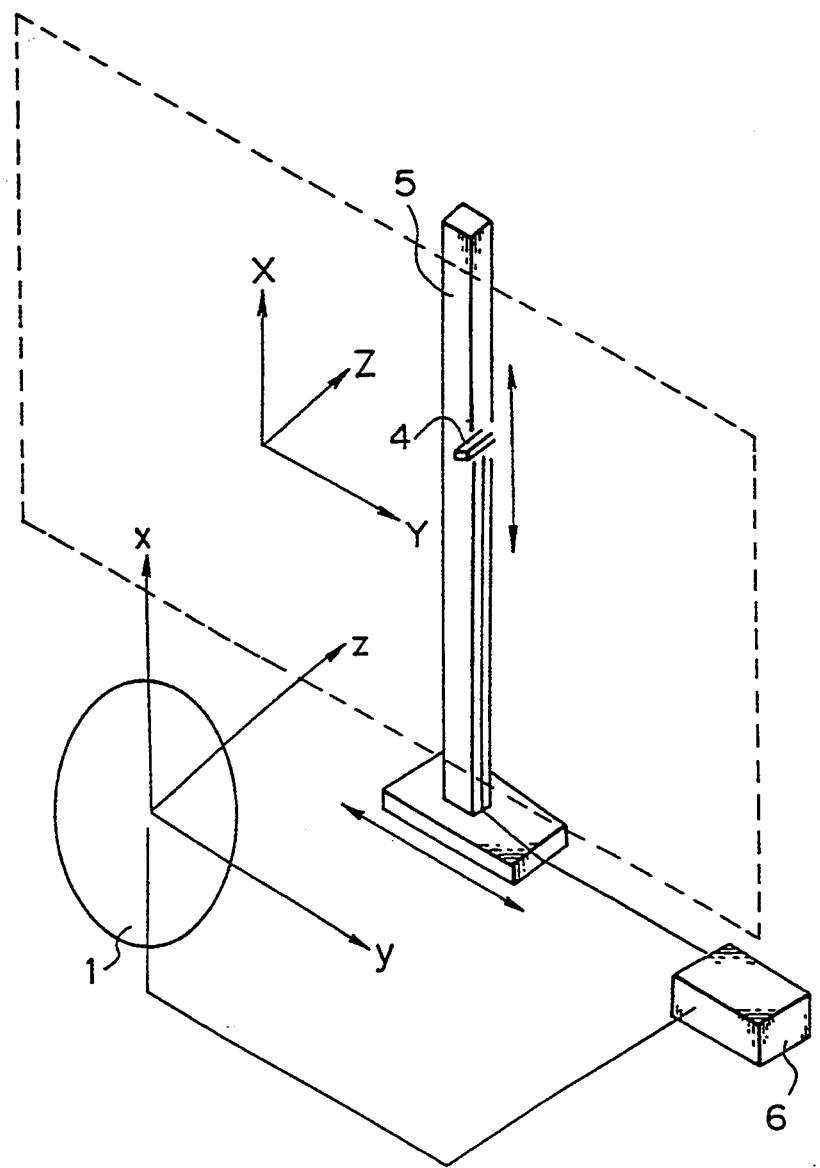
FIG. 2 is a schematic diagram illustrating the structure of another conventional antenna mirror surface measuring apparatus by measuring the electric field in the vicinity of an antenna.
Figure 5:
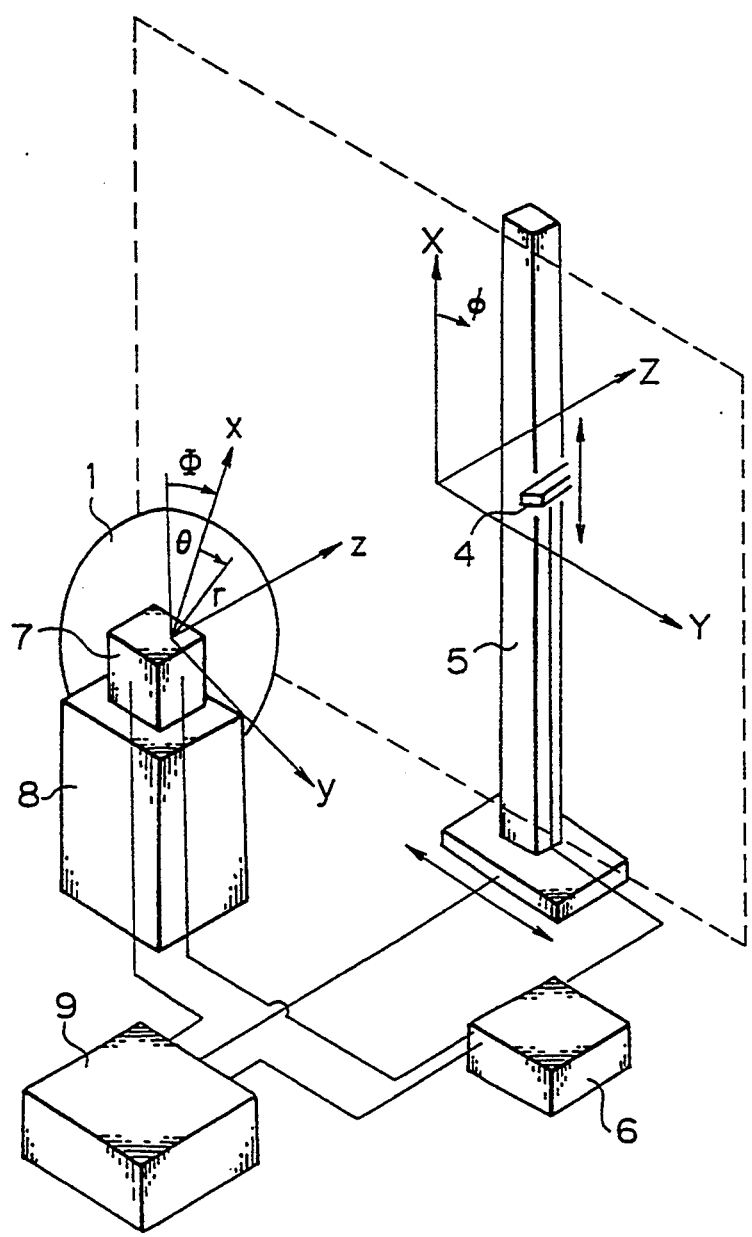
FIG. 5 is a schematic diagram illustrating a structure of the second embodiment of the present invention.

FIG. 5 is a schematic structural diagram indicating the second embodiment according to the present invention. The elements 1, 4 to 6 in FIG. 5 denote elements similar to those in the conventional apparatus shown in FIG. 2. The numerals 7 to 9 denote the elements same as those of the first embodiment of the present invention shown in FIG. 3. The beam axis of the antenna is defined as the axis coordinates system associated with the antenna is defined by the x-y-z orthogonal coordinates system, while the coordinates system associated with the scanner 5 is defined by the X-Y-Z orthogonal coordinates system, wherein the axes z and Z are aligned. The antenna i is placed so that the x-y plane and the X-Y are set in parallel. The positioner 7 rotates the antenna 1 up to an optional rotating angle $\Phi$ ($\phi = \theta + \Phi$) and fixes it in this condition. A probe 4 is driven by a scanner 5 so as to scan to measure two-dimensional electric field distribution of the fixed antenna 1. Next, the positioner 7 is rotated and is fixed a different rotating angle to measure the two-dimensional electric field distribution. The two-dimensional field distribution when the rotating angle is $\Phi_i$ can be obtained by repeating such measurement. A deviation from the phase distribution of an ideal mirror surface, namely a phase error $F_i(r, \theta)$ for each point can be obtained by the phase distribution of the measured values. The obtained phase error values thus obtained are expanded into series using the equations (1) to (4). Moreover, the deformation due to gravity is indicated by $\delta$ of the equation (5). When the component in the direction z of $\delta$ is defined as $\delta_z$, a phase error $\delta_p$ [rad] can be expressed as follows:

$$\delta_p(r, \theta, \phi) = \delta_z(r, \theta, \phi)(1 - \cos \Theta)(2\pi/\lambda) \quad (8)$$

Thereby, $\delta_p$ can be summarized with respect to $\phi$ similar to the equation (6). When a phase error generated by the intrinsic deformation of the mirror surface under the zero-gravity condition is defined as p $(r, \theta)$, a phase error F $(r, \theta, \Phi)$ can be expressed as follows:

$$F(r, \theta, \phi) = p(r, \theta) + \delta_p(r, \theta, \phi) \quad (9)$$

Thus, the intrinsic deformation p $(r, \theta)$ of the mirror surface under the zero-gravity condition and the deformation $\delta_p$ $(r, \theta, \phi)$ due to gravity can be obtained. In addition, in the present invention, since the intrinsic deformation of the mirror surface under the zero-gravity condition and the electric field distribution of the antenna to be measured can be measured, an electric characteristic under the zero-gravity condition can be obtained and the performance of antenna can be evaluated simultaneously.

Accordingly, the intrinsic deformation of the mirror surface under the zero-gravity condition and the deformation due to gravity can be separately measured by expanding the phase distribution of the predetermined point on the mirror surface into series using the polar coordinates system associated with the measuring system.

Here, it is noted that even if a transmitter and a receiver are integrated as a transceiver, of these are separately disposed, similar merits can be obtained.

Figure 6:
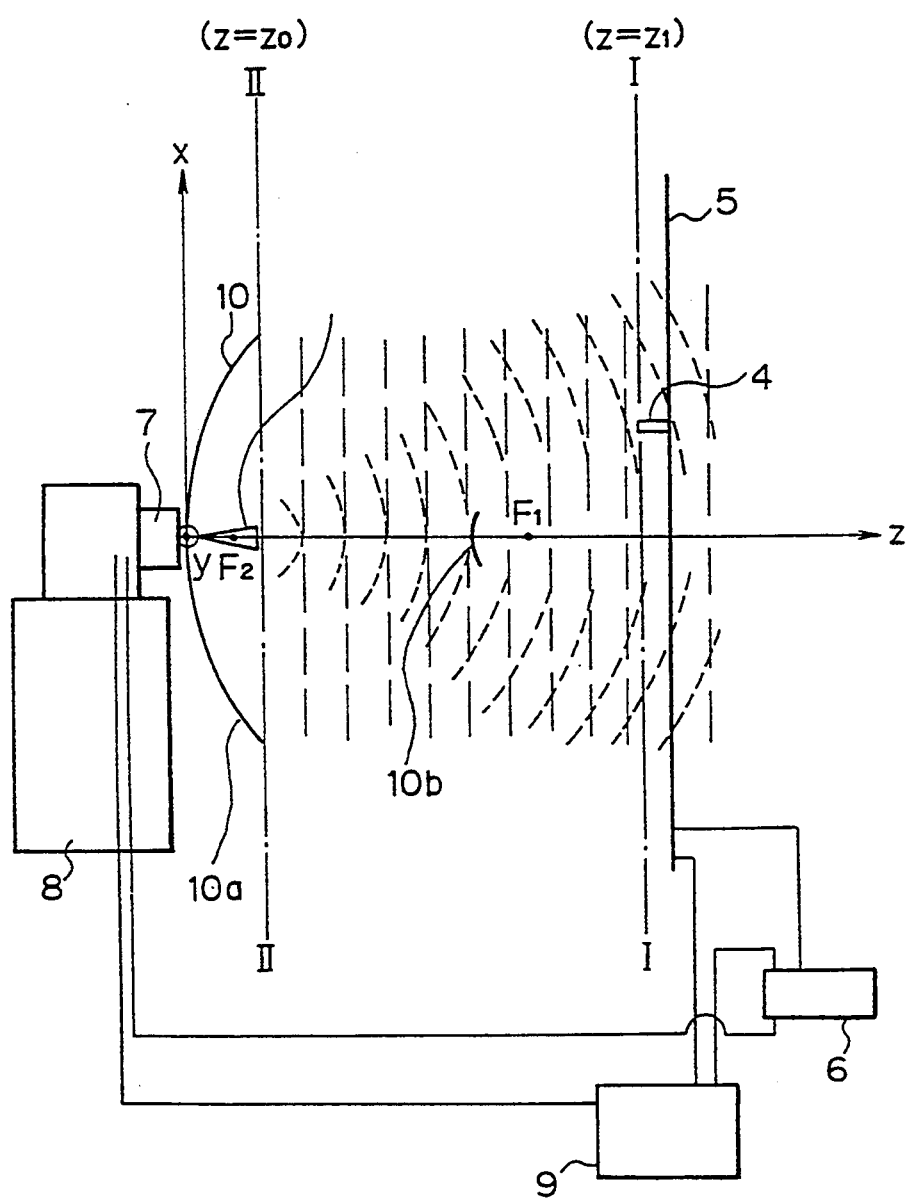
FIG. 6 is a schematic diagram illustrating a structure of the third embodiment of the present invention.
Figure 7:
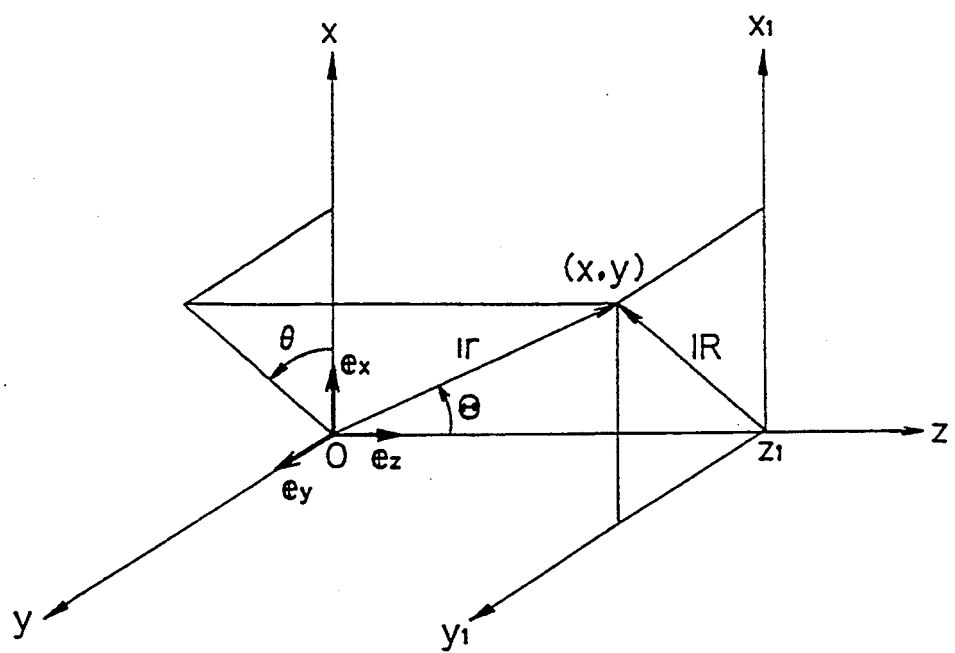
FIG. 7 is a diagram for explaining the coordinates system used in the third embodiment of the present invention.

FIG. 6 is a schematic diagram illustrating a structure of the third embodiment of the present invention. In FIG. 6, the numerals 4 to 6 denote elements similar to those of a conventional apparatus shown in FIG. 2. The numeral 7 to 9 denote elements similar to those of the first embodiment of the present invention shown in FIG. 3. In FIG. 3, an antenna 10 is a Cassegrain antenna, 10a denotes a main effecting mirror consisting of an axial symmetrical parabola having the focal length or distance $F_1$, 10b denotes a subreflecting mirror consisting of a hyperboloid of revolution having the focal distances $F_1$ and $F_2$, 10c denotes a primary born having the phase center at the point $F_2$. Measurement off the electric field distribution by placing a probe 4 nearer the main reflecting mirror 10a than the subreflecting mirror 10b is obvious from the figure. Therefore, the electric field distribution must be measured at a position such as a plane I—I. At the plane I—I, an electromagnetic wave radiated from the primary horn 10c is partly reflected by the subreflecting mirror 10b and goes to the main reflecting mirror 10a and is then reflected again thereby to propagate after being converted into the plane wave. On the other hand, a portion of the electromagnetic wave radiated from the primary horn 10c departs from the subreflecting mirror 10b and the spillover propagates as a spherical wave. FIG. 6, such plane waves and spherical waves are respectively indicated by a broken line and a dotted line. Therefore, interference fringes are generated by interference of these waves. It is noted that the measured phase distribution does not accurately represent the actual mirror surface. In order to eliminate the influence of such a spillover, the electric field distribution measured at the plane I—I is converted to that of waves which would exist at the plane II—II. Here, such a positional conversion of electric field distribution is made using a plane wave expansion method. When $z = z_1$ at the plane I—I, the field distribution vector E(r) can be expanded as follows:

$$E(r) = 1/(2\pi)\int [b(1,K)k_1 + b(2,K)K_2]e^{-j\gamma z_1}e^{-jK\cdot R}dK \quad (10)$$

$$\left. \begin{array}{l} K = k_x e_x + k_y e_y = (K\cos\theta, K\sin\theta) \\ |K_1| = |K/K \\ K_2 = e_z \times K_1 \\ \gamma k_2 = (k^2 - K^2)^{\frac{1}{2}} \\ k^2 = \omega^2 \mu \epsilon \end{array} \right\} \quad (11)$$

Where the vector b (1, K) denotes the spectrum of the plane wave of the electric field component of TM wave in regard to the axis z, the vector b (2, K) denotes the spectrum of the plane wave of the electric field component of TE wave in regard to the axis z, $\gamma$ is a propagation constant, k is the number of free space waves, $\omega$ is a propagation angular frequency, $\mu$ is the permeability, and $\epsilon$ is the dielectric constant. Moreover, in the coordinates system of FIG. 7, the vector r means the positional vectors (x, y, $z_1$), (r, 74, $\Theta$), while the vector R means the vector r, the vectors $e_x$, $e_y$, $e_z$ are unit vectors of the component perpendicular to the axis z of the positional x, y, z coordinates system, respectively, and b (m, k) is expressed as follows by the inverse Fourier transformation:

$$b(m,K) = e^{-j\gamma z_1}/(2\pi)K_m \cdot \int E_t(R_1 z_1)e^{-jK\cdot R}dR, \quad (m=1,2) \quad (12)$$

Here, $E_t$ is the component of the electric field distribution perpendicular to the axis z. Therefore, when $z = z_0$ in the plane II—II, the electric field distribution in the plane II—II can be obtained under the condition, $z = z_0$, by substituting the plane wave spectrum b (m, K) of the equation (12) into the equation (10). Thus, a phase distribution which accurately represents the mirror surface can be obtained and the deviation from the phase distribution of an ideal mirror surface, namely the phase error $F_i(r, \theta)$ can be obtained at each point. In addition, from the equations (8) and (9), the intrinsic deformation of the mirror surface under the zero-gravity condition and the deformation of the mirror surface due to gravity can be separately obtained in the same manner as the second embodiment of the present invention.

Thus, the influence of the primary horn or auxiliary reflecting mirror- other than the main reflecting mirror can be eliminated by converting the measured two-dimensional electric field distribution into the electric field distribution at the position nearer the mirror surface. Further, the intrinsic deformation of the mirror surface under the zero-gravity condition and the deformation of the mirror surface due to gravity can be separately measured.

Figure 8:
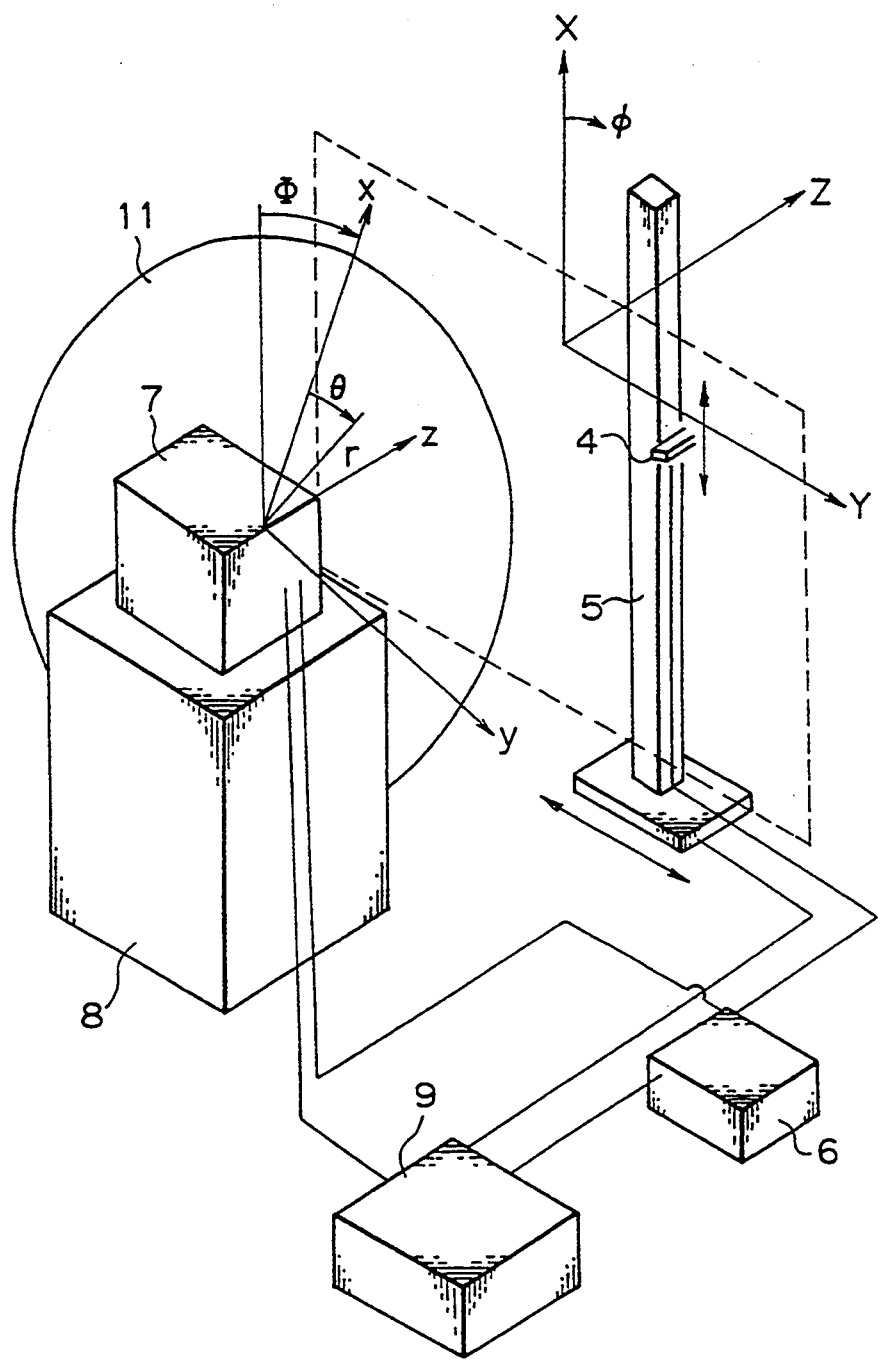
FIG. 8 is a schematic diagram illustrating a structure of the fourth embodiment of the present invention.
Figure 9:
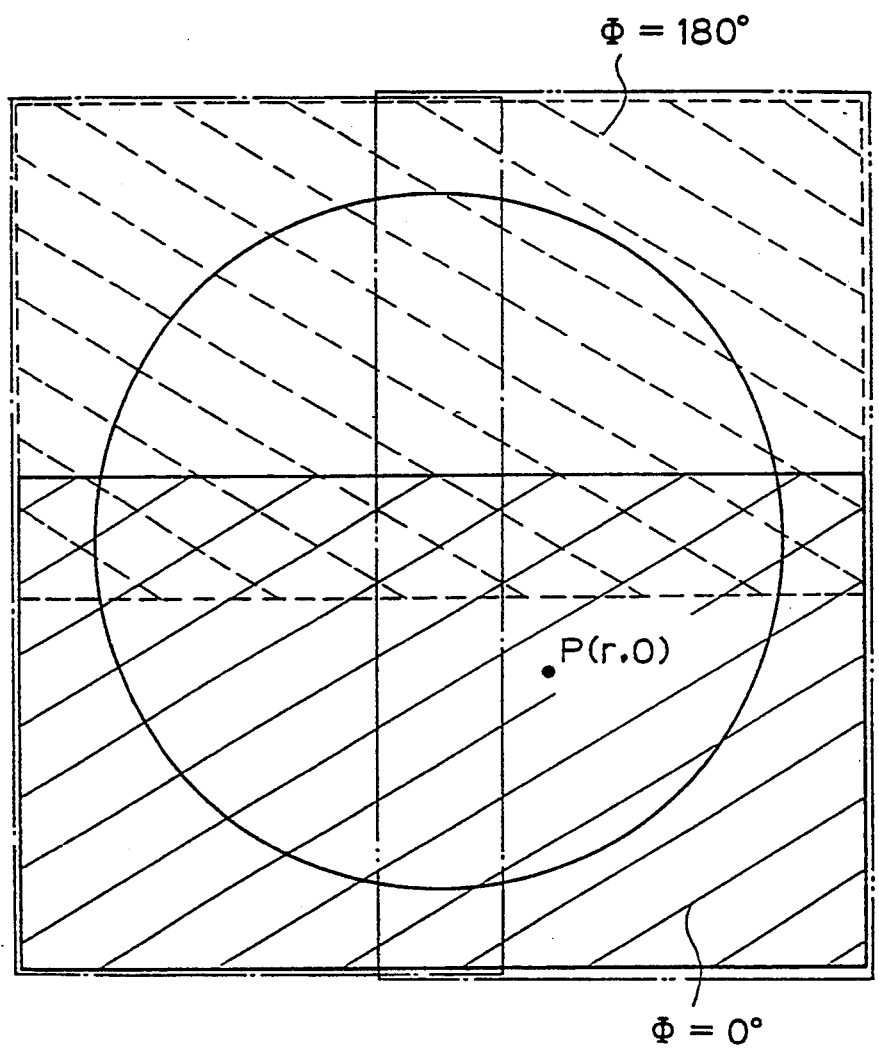
FIG. 9 is a diagram for explaining the fourth embodiment of the present invention.

FIG. 8 is a schematic diagram illustrating a structure of the fourth embodiment of the present invention. The reference numerals 4 to 6 denote elements similar to those of a conventional apparatus shown in FIG. 2. The numeral 7 to 9 are elements similar to those of the first embodiment of the present invention shown in FIG. 3. The numeral 11 denotes a large diameter antenna. FIG. 9 shows the aperture plane of the antenna 5 projected in the scanning surface off the scanner 5 and the range of scanner in such a case that the rotating angles are given at the intervals of 90°. In this figure, the scanning range when the rotating angle is 0° is indicated by solid lines and oblique solid lines, the scanning range when the rotating angle is 180° is indicated by broken lines and oblique broken lines, the scanning range when the rotating angle is 90° is indicated by a dot-and-dash chain line, and the scanning range when the rotating angle is 270° is indicated by a two-dots-and-dash chain line. Here, the scanner 5 does not scan the entire part of the aperture plane. When the rotating angle is $\Phi_i$, the scanning range is set to $S_i$ and the measured value of the phase distribution is set to $F_i(r, \theta)$ and the Fourier coefficient of the equation (1) is obtained by the least squares method. First, the least square error $e(r, \theta)$ is defined as follows:

$$\epsilon(r,\theta) = \Sigma \Omega_i^2 \\ \Omega_i = \begin{cases} |F(r,\theta,\phi) - F_i(r,\theta)|, & \text{(inside } S_i\text{)} \\ 0, & \text{(outside } S_i\text{)} \end{cases} \quad (13)$$

From this equation, $e(r, \theta)$ is minimized for each point $(r, \theta)$. Namely, the Fourier coefficients $a_o(r, \theta)$, $a_n(5, \theta)$, $b_n(r, \theta)$ can be obtained by solving the following equation:

$$\begin{aligned} \partial\epsilon(r,\theta)/\partial a_j(r,\theta) &= 0, (j = 1,2,\ldots,M_1) \\ \partial\epsilon(r,\theta)/\partial b_j(r,\theta) &= 0, (j = 1,2,\ldots,M_2) \end{aligned} \quad (14)$$

Therefore, the Fourier coefficients can be solved in a manner similar to the second embodiment of the present invention by comparing them with the coefficients of the equation (9).

Thus, since the range for measuring the field distribution of an antenna by scanning the probe with the scanner is narrowed more than the aperture plane of the antenna, the intrinsic deformation of the mirror surface under the zero-gravity condition and the deformation of the mirror surface due to gravity can be separately measured even for a large diameter antenna.

In this embodiment, the electric field distribution of an antenna to be measured is measured, but the similar effect can also be ensured by a mechanical measurement of the configuration of the mirror surface with a theodolite as in the case of the first embodiment.

Figure 10:
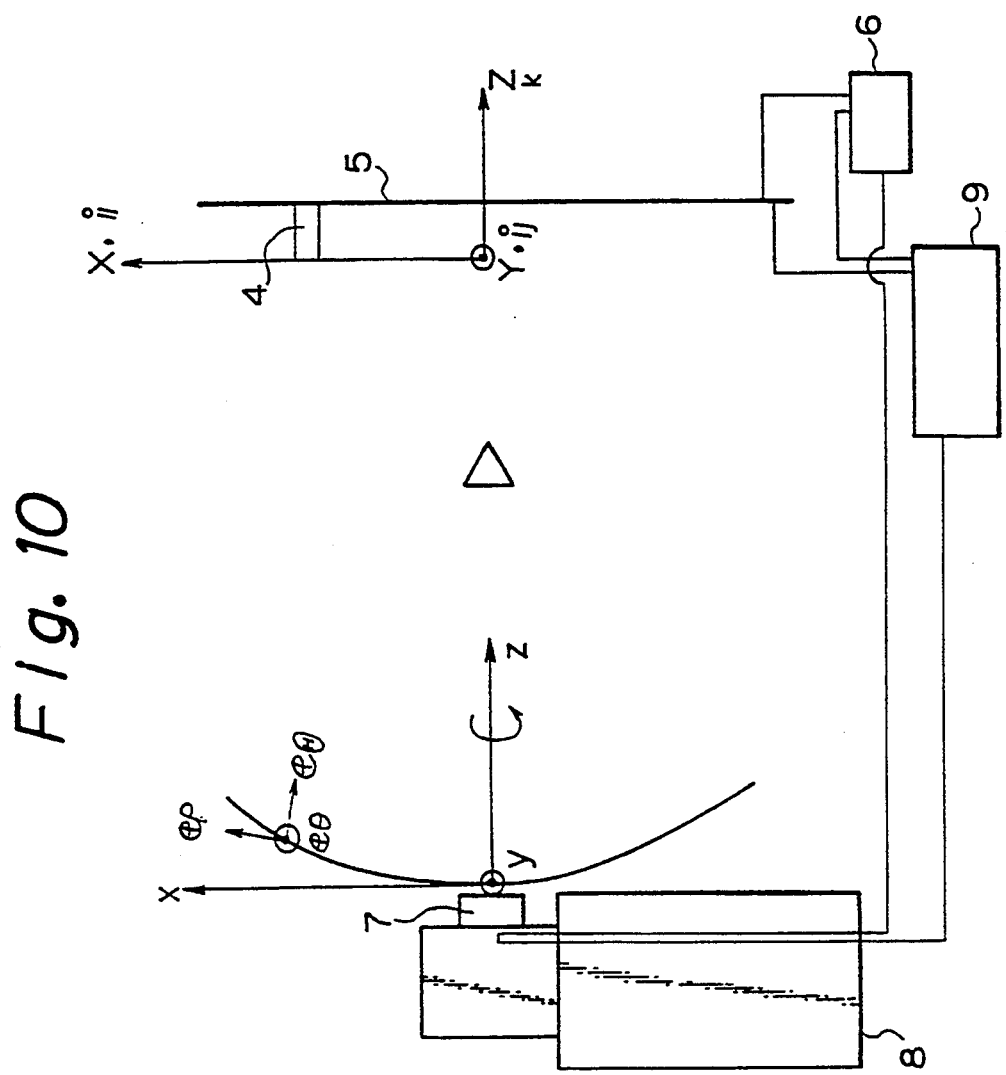
FIG. 10 is a schematic diagram illustrating a structure of the fifth embodiment of the present invention.

FIG. 10 is a schematic diagram illustrating a structure of the sixth embodiment of the present invention. The reference numerals 4 to 6 denote elements similar to those in the conventional apparatus shown in FIG. 2. The numerals 7 to 9 denote elements similar to those off the first embodiment of the present invention shown in FIG. 3. A positioner 7 is set to rotate around the axis orthogonal to the direction vector of the gravitational force, making parallel the aperture plane and the scanning surface of the scanner. When the orthogonal unit vector (i, j, k) depending on the measuring system is defined, the vector G of the gravity is defined as follows:

$$G = -gi \quad (15)$$

Moreover, when the mirror surface is rotational symmetry, the normal unit vector n of the mirror surface is expressed as follows from the unit vector ($e_p$, $e_\Theta$, $e_\theta$) of the spherical coordinates system:

$$n = Ae_p + Be_\Theta \quad (16)$$

The deformation $\delta_p(r, \theta, \phi)$ can be expressed as follows by substituting the equations (5), (8) into the equations (15) and (16):

$$\delta_p(r, \theta, \Phi) = A_1(r, \theta, \phi) \cos \phi \quad (17)$$

When the coefficients are compared with those of the equation (1) after substituting the equation (17) into the equation (9), the Fourier coefficient $a_o(r, \theta)$ corresponds to the intrinsic deformation $p(r, \theta)$ of the mirror surface and $a_1(r, \theta) \cos \phi$ corresponds to the deformation $\delta_p(r, \theta, \phi)$ caused by gravity.

Accordingly, since the positioner rotates around the axis orthogonal to the direction vector of gravity force, the intrinsic deformation of the mirror surface under the zero-gravity condition and the deformation of the mirror surface due to the gravity can be separately measured.

In this embodiment 5, an electric field distribution of an antenna to be measured is measured, but it should be noted that a similar effect can also be obtained even when a mechanical measurement of a shape of mirror surface is used with a theodolite.

Figure 11:
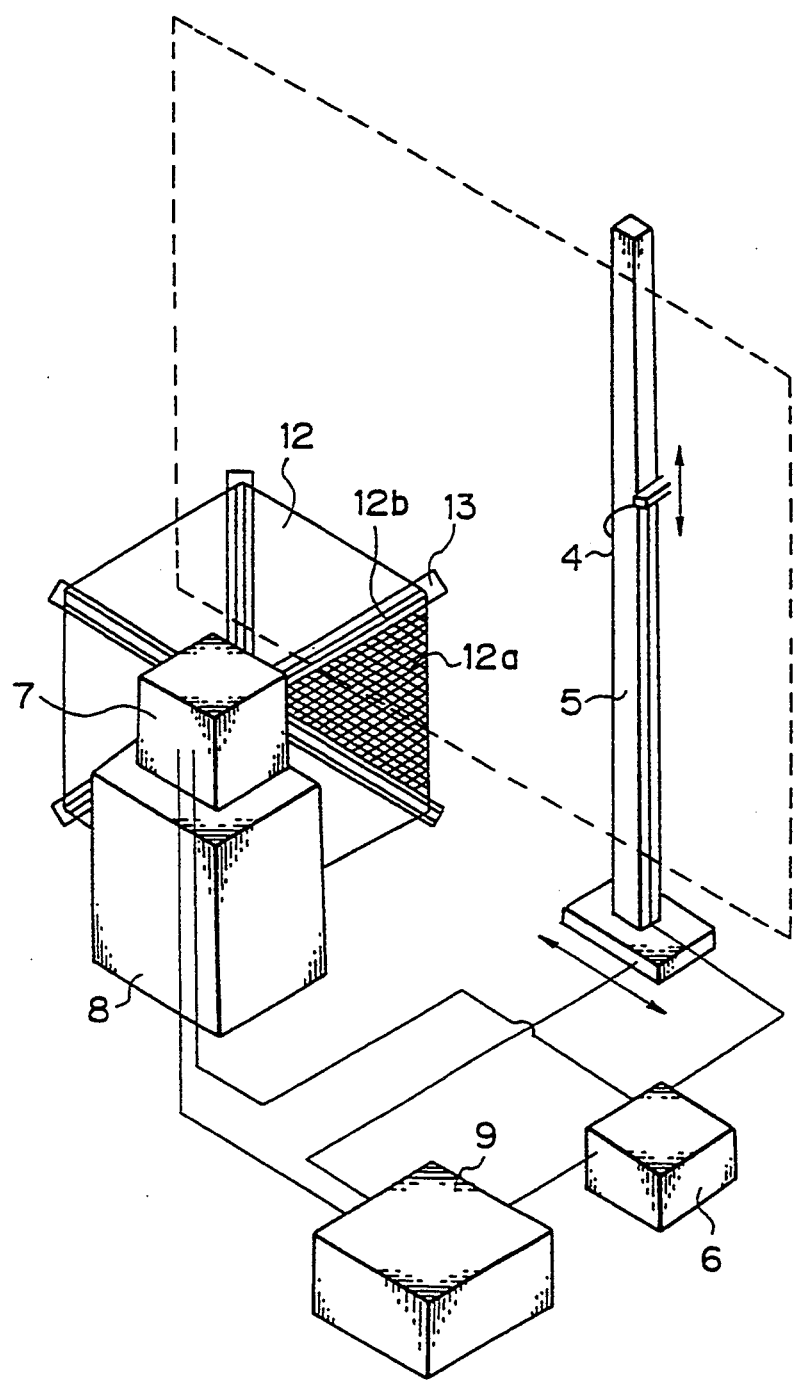
FIG. 11 is a schematic diagram illustrating a structure of the sixth embodiment of the present invention and FIG. 12 is a schematic diagram illustrating a structure of the seventh embodiment of the present invention.

FIG. 11 is a schematic diagram illustrating a structure of the fifth embodiment of the present invention. The reference numerals 4 to 6 denote elements similar to those of the conventional apparatus shown in FIG. 2. The numerals 7 to 9 denote elements similar to those of the first embodiment of the present invention shown in FIG. 3. The numeral 12 denotes a mesh antenna consisting of a metallic mesh 12a and a mast 12b, 13 denotes a supporting means formed by a material having a high rigidity for fixing the mast 12b in order to suppress the deformation due to gravity to a small quantity when the antenna rotates. When the antenna is rotated by a positioner 7, if the mirror surface generates non-linear deformation, the component of high order Fourier coefficient becomes large in the equation (1) and the Fourier expansion becomes difficult in the case where the number of times of measurement becomes small. The solution can be obtained in the same manner as the second embodiment of the present invention by controlling a deformation of the mast to a linear deformation using the supporting means 13.

Thus, since the supporting means formed by a material having a high rigidity fixes and rotates the mast for extending a metal mesh, the intrinsic deformation of the mirror surface under the zero-gravity condition and the deformation of the mirror surface due to gravity can be separately measured, even when the mirror surface generates extremely large deformation due to gravity.

In this embodiment, the electric field distribution of an antenna to be measured is measured, but the similar effect can also be obtained by mechanical measurement of a shape of mirror surface using a theodolite as in the case of the first embodiment.

Figure 12:
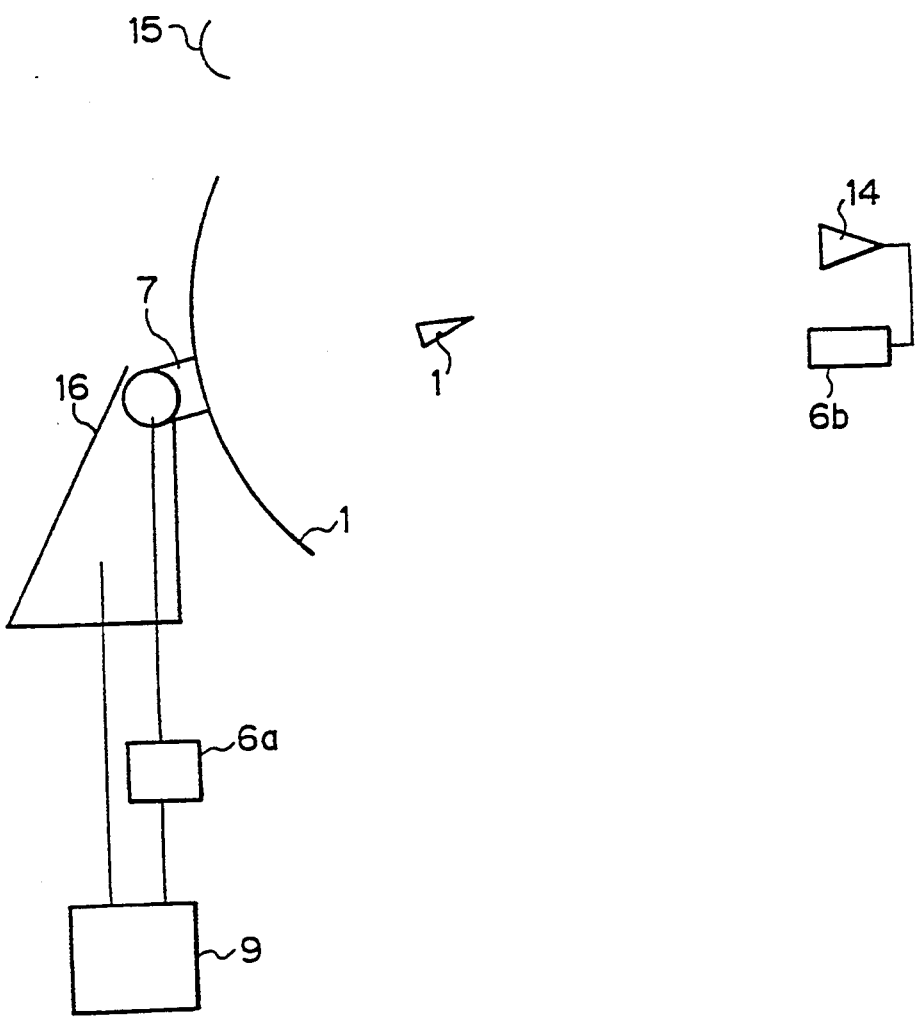

Referring now to FIG. 12, there is shown a schematic diagram illustrating a structure o-F the seventh embodiment of the present invention. The reference numerals 1, 6, 7, and 9 denote elements similar to those of the first embodiment of the present invention shown in FIG. 3. The numeral 14 denotes a transmitting antenna, 15 denotes a reference antenna, 16 denotes a rotating base for spherical scanning. A positioner 7 rotates around the beam axis of the antenna, stops at a predetermined rotating angle, measures the two-dimensional electric field distribution of the antenna by the spherical scanning at different rotating angles converts the measured values of two-dimensional field distribution into the field distribution at a position nearer the mirror surface with a computer in order to obtain the phase distribution corresponding to a predetermined position on the mirror surface. Such a positional conversion of electric field distribution can be obtained from the equations (10) to (12). Moreover, since the spillover by the primary horn and the diffraction wave by the subreflecting mirror give influence on a wide angle plane, this influence can be reduced by measuring the electric field distribution at sufficiently far area. Here, when the two-dimensional electric field distribution at the distant position is defined as $E_i(\theta', \Phi')$ for the rotating angle $\phi_i$ and positional conversion is executed to the aperture surface of $z=0$, the electric field distribution $E_{i(ap)}(x, y)$ at the aperture surface is expressed as follows:

$$E_{i(ap)}(x,y) = \int\int E_i(\theta', \phi')e^{-j(x\theta'+y\phi')}d\theta'd\phi' \quad (18)$$

Thus, the phase distribution $F_i(r, \theta)$ can be obtained and the solution can be obtained in the same manner as the second embodiment of the present invention.

Accordingly, the intrinsic deformation of the mirror surface under the zero-gravity condition and the deformation of the mirror surface due to gravity can be separately measured by measuring the values at a far field.

In the ease of this embodiment, an antenna to be measured is in the receiving operation. But, in the case where the antenna is in the transmitting operation, the similar effect can also be attained. In addition, in the embodiments 2 to 6, the transmitting and receiving operations are changeable and similar merits can be achieved in either operation mode. In the above embodiments, the electric field distribution is measured at the far field of the antenna to be measured, but similar merits can also be attained even when the electric field distribution is measured in the vicinity of the antenna. Moreover, in the above embodiments, the rotating base is capable of rotating around two or more axes for the spherical scanning, but similar merits can also be obtained even if the rotating base rotates around only one axis and the scanner scans the antenna or probe only in one direction for the cylindrical scanning. Further, similar merits can also be obtained even when the electric field distribution is converted to that in a different position as in the case of the third embodiment. In addition, similar merits can be obtained even if the rotating axis of the positioner is set within the horizontal plane as in the case of the fifth embodiment. Moreover, similar meritorious effects can also be achieved even if the supporting means is provided behind the antenna as in the case of the sixth embodiment.

As explained above, the antenna mirror surface measuring apparatus according to the first aspect of the present invention provides the merits that the intrinsic deformation of mirror surface under the zero-gravity condition and the deformation of mirror surface due to gravity can be separately measured, because the positioner stops the antenna to be measured at a predetermined rotating angle, the distance and angle measuring means and a controller measure the shape of the mirror surface of the antenna to be measured at different rotating angles and the computer expands -the shape of a predetermined point on the mirror surface into series on the polar coordinates system fixed to the measuring system.

Moreover, the antenna mirror surface measuring apparatus according to the second aspect of the invention provides the merits that the electrical characteristics under the zero-gravity condition can be measured and the intrinsic deformation of mirror surface under the zero-gravity condition and the deformation of mirror surface by gravity can separately be measured, because the positioner stops the antenna to be measured at -the predetermined rotating angle, the probe, scanner and transceiver measure two-dimensional electric field distribution of this antenna to be measured at different rotating angles, and the computer expands the phase distribution of predetermined point on the mirror surface to series on the polar coordinates system fixed to the measuring system.

In addition, the antenna mirror surface measuring apparatus according to the third aspect of the invention provides the merits that the outdoor measurement is made easier since the scanner is not required, measurement is suitable for a large diameter antenna and the intrinsic deformation of mirror surface under the zero-gravity condition and the deformation of mirror surface by gravity can be separately measured, because the positioner stops the antenna at the predetermined rotating angle and realizes the spherical scanning or cylindrical scanning since the rotating base has two or more rotating axes, the probe and transceiver measure the electric field distributions at different rotating angles of the antenna and the computer obtains the electric field distribution in the vicinity of antenna from the measured values and expands the phase distribution of the predetermined point on the mirror surface into series on the polar coordinates system fixed to the measuring system.

Furthermore, the antenna mirror surface measuring method according to the fourth aspect of the invention provides the merits that the influence of the primary horn or subreflecting mirror other than the main reflecting mirror can be eliminated and the intrinsic deformation of mirror surface under the zero-gravity condition and the deformation of mirror surface by gravity can separately be measured, because measured values of two-dimensional electric field distribution of the reflecting mirror antenna can be converted to positions different from the measuring position.

Moreover, the antenna mirror surface measuring method according to the fifth aspect of the invention provides the merits that the shape of mirror surface of a larger diameter antenna is scanned with the probe which is driven by the scanner for the range narrower than the antenna diameter and the intrinsic deformation of mirror surface under the zero-gravity condition and the deformation of mirror surface due to gravity can be separately measured, because the range for measuring the electric field distribution off the antenna to be measured can be made narrower than the aperture plane.

What is claimed is:

1. An antenna mirror surface measuring apparatus for measuring the mirror surface configuration of a reflecting mirror antenna using a distance and angle measuring means, said apparatus comprising:
   a positioner which
      supports the antenna to be measured,
      rotates the antenna around a main beam of the antenna defining an axis of rotation, and
      stops the antenna at a plurality of predetermined rotating angles;
   means for measuring the configuration of the antenna mirror surface at each of the plurality of predetermined rotating angles and for providing measured values including coordinates; and
   a computer including,
      means for receiving the measured values, the measured values being functions of coordinates corresponding to the mirror surface configuration and the rotating angle component,
      means for expanding the measured values by using a Fourier series for the rotating angle component,
      means for calculating Fourier coefficient distributions as functions of the coordinate components corresponding to the configuration, and
      means for determining the configuration of the mirror surface independent of the rotating angles given by the calculated 0-order Fourier coefficient distribution and the deformation of the mirror surface depending on the rotating angles given by higher order Fourier coefficient distributions, the configuration and deformation being determined directly from the measured values.

2. An antenna mirror surface measuring apparatus for measuring the electric field distribution in the vicinity of a reflecting mirror antenna, the apparatus comprising:
   a near field measuring apparatus having
      a probe for measuring the electric field distribution,
      a scanner for scanning said probe, and
      a transceiver for transmitting and receiving signals between an antenna to be measured and said probe to provide measured values;
   a positioner which
      supports the antenna to be measured,
      rotates the antenna around a main beam of the antenna defining an rotation axis, and
      stops the antenna at a plurality of predetermined rotating angles so that the electric field distribution can be measured by the near field measuring apparatus at each of the plurality of rotating angles to provide coordinates corresponding to the mirror surface configuration; and
   a computer including
      means for determining measured values of the configuration based on the phase term of the electric field distribution,
      means for receiving the measured values, the measured values being functions of the coordinates and the rotating angle component,
      means for expanding the measured values by using a Fourier series for the rotating angle component,
      means for calculating Fourier coefficient distributions as functions of the coordinates, and
      means for determining the configuration of the mirror surface independent of the rotating angles and the deformation of the mirror surface depending on the rotating angles directly from the measured values.

3. An antenna mirror surface measuring apparatus comprising:
   a rotating base supporting an antenna to be measured and having two or more rotating axes;
   a probe;
   a transceiver for transmitting and receiving a signal between an antenna to be measured and the probe, the received signals including measured values;
   means for receiving the measured values based on a plane wave expansion or a spherical wave expansion to obtain an electric field distribution in the vicinity of a reflecting mirror antenna, the measured values being functions of coordinates corresponding to the mirror surface configuration and a rotating angle component, at a plurality of predetermined rotating angles, a configuration of the mirror surface being obtained from the phase term of the electric field distribution;
   a positioner which supports the antenna to be measured, rotates the antenna around a main beam of the antenna defining a rotation axis, and stops the antenna;
   a computer having
      means for receiving the measured values,
      means for calculating Fourier coefficient distributions as functions of the coordinate components corresponding to the configuration, and
      means for determining the configuration of the mirror surface independent of the rotating angles and the deformation of the mirror surface depending on the rotating angles based on the Fourier coefficients.

4. A method for measuring an antenna mirror surface comprising the steps of:
   measuring a two dimensional electric field distribution in the vicinity of a reflecting mirror antenna to produce measured values;
   converting the measured values into a converted electric field distribution at a horn aperture plane through arithmetic operations using a plane wave expansion;
   determining the configuration of the mirror surface from the phase term of the converted electric field distribution; and
   determining, directly from the converted distribution, the configuration of the mirror surface independent of the rotating angles and the deformation of the mirror surface depending on the rotating angles to determine the configuration of the mirror antenna under a zero-gravity condition.

5. An antenna mirror surface measuring method comprising the steps of:

rotating a reflecting mirror antenna;

measuring a two dimensional electric field distribution at an aperture plane of the reflecting mirror antenna by measuring in the vicinity of the aperture of said reflecting mirror antenna while the reflecting mirror antenna, which is measured over a range which is smaller than the aperture of said reflecting mirror antenna, is rotating; and determining, directly from the measurements, the configuration of the mirror surface independent of the rotating angles and the deformation of the mirror surface depending on the rotating angles to determine the configuration of the mirror antenna under a zero-gravity condition.

6. A method for measuring a mirror surface of a reflecting mirror antenna to determine the effects of gravity, the method comprising the following steps:

positioning the antenna on a positioner;

rotating the antenna about a main beam of the antenna;

stopping the antenna at a plurality of different rotating angles;

measuring the configuration of the antenna mirror surface at each of the plurality of different rotating angles;

expanding the measured values of the mirror surface error by using a Fourier series of the rotating angle component; and determining directly from the measured values the deformation due to gravity from higher order coefficients of the Fourier series, and the intrinsic deformation of the mirror surface under the zero-gravity condition from the 0-order coefficients of the Fourier series.

7. A method for measuring the mirror surface configuration of a reflecting mirror antenna to determine the effects of gravity, the method comprising the following steps:

rotating an antenna about a main beam of the antenna defining an axis of rotation;

stopping the antenna at a plurality of predetermined rotating angles;

measuring the electric field distribution at each of the plurality of different rotating angles to obtain measured values;

expanding the measured values by using a Fourier series of the angle component of the antenna rotating around the main beam of the antenna; and determining from a phase term of the electric field distribution measurements the deformation of the mirror surface due to gravity and the intrinsic deformation of the mirror surface under the zero-gravity condition.

8. The apparatus of claim 1 wherein the positioner supports the antenna so that the axis of rotation is orthogonal to the direction of gravity.

9. The apparatus of claim 2 wherein the positioner supports the antenna so that the axis of rotation is orthogonal to the direction of gravity.

10. The apparatus of claim 2 wherein the antenna is a Cassegrain antenna.

11. The apparatus of claim 2 wherein the antenna includes a metallic mesh.

12. The method of claim 5 wherein the determining step includes expanding the measurements with a Fourier series so that a 0-order coefficient distribution is independent of a rotating angle, and a higher order distribution is dependent on the rotating angle.

13. The method of claim 7 wherein the determining step includes expanding the measured values with a Fourier series so that a 0-order coefficient distribution is independent of a rotating angle, and a higher order distribution is dependent on the rotating angle.

14. The method of claim 4 wherein the determining step includes expanding the measurements with a Fourier series so that a 0-order coefficient distribution is independent of a rotating angle, and a higher order distribution is dependent on the rotating angle.

* * * * *